(12) United States Patent
Wu et al.

(10) Patent No.: US 12,452,691 B2
(45) Date of Patent: Oct. 21, 2025

(54) NON-TERRESTRIAL NETWORK COMMUNICATION METHOD AND APPARATUS

(71) Applicant: HUAWEI TECHNOLOGIES CO., LTD., Guangdong (CN)

(72) Inventors: Yedan Wu, Shanghai (CN); Tingting Geng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 308 days.

(21) Appl. No.: 17/984,378

(22) Filed: Nov. 10, 2022

(65) Prior Publication Data

US 2023/0096165 A1    Mar. 30, 2023

Related U.S. Application Data

(63) Continuation of application No. PCT/CN2021/092679, filed on May 10, 2021.

(30) Foreign Application Priority Data

May 11, 2020   (CN) .......................... 202010392155.X

(51) Int. Cl.
*H04W 16/24*     (2009.01)
*H04H 20/74*     (2008.01)

(52) U.S. Cl.
CPC ............ *H04W 16/24* (2013.01); *H04H 20/74* (2013.01)

(58) Field of Classification Search
CPC ............... H04W 16/24; H04W 36/083; H04W 36/008357; H04W 84/06; H04W 84/005;
(Continued)

(56) References Cited

U.S. PATENT DOCUMENTS

2020/0178135 A1\*   6/2020   Yun .................... H04W 36/0061
2021/0014930 A1\*   1/2021   Nam ..................... H04W 76/27
(Continued)

FOREIGN PATENT DOCUMENTS

CN   110536341 A   12/2019
CN   110972257 A   4/2020
(Continued)

OTHER PUBLICATIONS

LG Electronics Inc: "Report on email discussion [107#64][NTN] Cell Selection & reselection", 3GPP Draft; R2-1914070, vol. RAN WG2, no. Chongqing, China; Oct. 14, 2019-Oct. 18, 2019 (Year: 2019).\*

(Continued)

*Primary Examiner* — Yuwen Pan
*Assistant Examiner* — Swati Jain

(57) ABSTRACT

This application provides a non-terrestrial network (NTN) communication method and an apparatus. When performing a delay-sensitive communication service, UE may select a cell covered by a satellite since the UE cannot distinguish between a cell covered by a terrestrial base station and the cell covered by the satellite. A first network device determines cell type information of a cell covered by a second network device, where the cell type information indicates that the cell is a terrestrial network communication cell or a non-terrestrial network communication cell; and the first network device sends the cell type information to a third network device.

19 Claims, 10 Drawing Sheets

(58) Field of Classification Search
CPC ... H04W 76/10; H04H 20/74; H04B 7/18563; H04B 7/1851; H04B 7/18513; H04B 7/18519

See application file for complete search history.

(56) References Cited

U.S. PATENT DOCUMENTS

| | | | |
|---|---|---|---|
| 2021/0250781 A1* | 8/2021 | Dang | H04B 7/0408 |
| 2021/0250816 A1* | 8/2021 | Xu | H04W 36/0016 |
| 2021/0297149 A1* | 9/2021 | Hsieh | H04B 7/18589 |
| 2021/0321357 A1* | 10/2021 | Shrestha | H04W 68/005 |
| 2022/0225224 A1* | 7/2022 | Shi | H04W 48/18 |
| 2023/0140643 A1* | 5/2023 | Hancharik | H04B 7/18515 455/12.1 |
| 2024/0340855 A1* | 10/2024 | Dou | H04W 68/02 |
| 2024/0406816 A1* | 12/2024 | Deenoo | H04B 7/18513 |

FOREIGN PATENT DOCUMENTS

| | | |
|---|---|---|
| CN | 111132254 A | 5/2020 |
| EP | 3962154 A1 | 3/2022 |
| WO | 2020034333 A1 | 2/2020 |
| WO | 2020092561 A1 | 5/2020 |

OTHER PUBLICATIONS

LG Electronics Inc: "Report on email discussion [107#64][NTN] Cell Selection & reselection", 3GPP Draft; R2-1914070, vol. RAN WG2, no. Chongqing, China; Oct. 14, 2019-Oct. 18, 2019 (Year: 2019) (Year: 2019).*

3GPP TS 38.473 V16.1.0 (Mar. 2020), 3rd Generation Partnership Project; Technical Specification Group Radio Access Network; NG-RAN; F1 application protocol (F1AP) (Release 16), 240 pages.

3GPP TS 38.463 V16.1.1 (Apr. 2020), 3rd Generation Partnership Project; Technical Specification Group Radio Access Network; NG-RAN; E1 Application Protocol (E1AP) (Release 16), 191 pages.

3GPP TR 38.821 V16.0.0 (Dec. 2019), 3rd Generation Partnership Project; Technical Specification Group Radio Access Network; Solutions for NR to support non-terrestrial networks (NTN) (Release 16), 140 pages.

3GPP TS 38.413 V16.1.0 (Mar. 2020), 3rd Generation Partnership Project; Technical Specification Group Radio Access Network; NG-RAN; NG Application Protocol (NGAP) (Release 16), 341 pages.

3GPP TS 38.423 V16.1.0 (Mar. 2020), 3rd Generation Partnership Project; Technical Specification Group Radio Access Network; NG-RAN; Xn application protocol (XnAP) (Release 16), 334 pages.

International Search Report and Written Opinion issued in PCT/CN2021/092679, dated Jul. 7, 2021, 10 pages.

LG Electronics Inc., Report on email discussion [107#64][NTN] Cell Selection and reselection. 3GPP TSG-RAN WG2 Meeting #107bis, Chongqing, China, Oct. 14-Oct. 18, 2019, R2-1914070, 21 pages.

Extended European Search Report issued in EP21804658.9, dated Sep. 28, 2023, 9 pages.

* cited by examiner

NON-TERRESTRIAL NETWORK COMMUNICATION METHOD AND APPARATUS

CROSS-REFERENCE TO RELATED APPLICATIONS

This application is a continuation of International Application No. PCT/CN2021/092679, filed on May 10, 2021, which claims priority to Chinese Patent Application No. 202010392155.X, filed on May 11, 2020. The disclosures of the aforementioned applications are hereby incorporated by reference in their entireties.

TECHNICAL FIELD

The present invention relates to the field of communication technologies, and in particular, to a non-terrestrial network communication method and an apparatus.

BACKGROUND

A non-terrestrial network (NTN) includes a satellite communication network. Satellite communication may be communication performed by a terrestrial base station by using a satellite as a relay. A higher orbit of the satellite indicates a larger coverage area of the satellite but a longer communication delay.

In satellite communication, a signal of a terrestrial base station connected to a satellite may be forwarded by the satellite. After being forwarded by the satellite, the signal of the terrestrial base station connected to the satellite, different from a signal of a common terrestrial base station, has features such as wide coverage and a long delay. Such differences greatly affect services of user equipment (UE), and further affect handover decision and the like. For example, when performing a delay-sensitive communication service, the UE may select a cell covered by the satellite since the UE cannot distinguish between a cell covered by the terrestrial base station and the cell covered by the satellite, resulting in poor communication quality and user experience.

SUMMARY

This application provides an NTN communication method and an apparatus, to resolve the following problem: When performing a delay-sensitive communication service, UE may select a cell covered by a satellite since the UE cannot distinguish between a cell covered by a terrestrial base station and the cell covered by the satellite, resulting in poor communication quality.

According to a first aspect, this application provides an NTN communication method. The method may be applied to a network device, a chip, a chipset, a function module in a chip that performs the method, or the like. The network device is used as an example. The method includes the following steps. A first network device determines cell type information of a cell covered by a second network device, where the cell type information indicates that the cell is a terrestrial network communication cell or a non-terrestrial network communication cell; and the first network device sends the cell type information to a third network device.

In an NTN scenario in this embodiment, when the first network device establishes an interface connection to the third network device, a related NTN indication (to be specific, the cell type information of the second network device) is carried. This helps the third network device learn of capabilities and features of the second network device. Because the first network device and the second network device are communicatively connected, this helps the third network device further learn of capabilities and features of the first network device according to this embodiment. Therefore, since a terminal device can distinguish between a cell covered by a terrestrial network and a cell covered by a satellite, the following case can be avoided: A delay-sensitive communication service is handed over to the satellite cell. This improves communication quality.

In a possible design, the second network device is configured to forward a signal of the first network device. In the foregoing design, indication information of a relay satellite is sent to the third network device, helping the third network device further learn of an NTN capability of the first network device.

In a possible design, the cell type information further indicates that a neighboring cell is a terrestrial network communication cell or a non-terrestrial network communication cell. In the foregoing design, whether the neighboring cell is a non-terrestrial network communication cell is indicated, helping the third network device further learn of the capabilities and the features of the first network device.

In a possible design, if the cell type information indicates that the cell is a non-terrestrial network communication cell, the cell type information further indicates an orbit type of the second network device, and the orbit type includes a low-earth orbit, a medium-earth orbit, and a geostationary earth orbit. In the foregoing design, orbit information of the relay satellite is indicated, helping the third network device further learn of the NTN capability of the first network device.

In a possible design, the cell type information further indicates that the cell is a moving cell or a fixed cell. In the foregoing design, a type of the satellite cell is indicated, helping the third network device further learn of the NTN capability of the first network device.

In a possible design, the first network device may be a base station, and the third network device may be a core network device.

In a possible design, the first network device is a distributed unit (DU) of a base station, and the third network device is a central unit (CU) of the base station.

In a possible design, the first network device is a first base station, and the third network device is a second base station.

In a possible design, the first network device is a central unit control plane (CU-CP), and the third network device is a central unit user plane (CU-UP).

According to a second aspect, this application provides an NTN method. The method may be applied to a network device, a chip, a chipset, a function module in a chip that performs the method, or the like. The network device is used as an example. The method includes: A third network device receives cell type information sent by a first network device, where the cell type information indicates that a cell covered by a second network device is a terrestrial network communication cell or a non-terrestrial network communication cell; and the third network device stores about the cell type information.

In an NTN scenario in this embodiment, when the first network device establishes an interface connection to the third network device, a related NTN indication (to be specific, the cell type information of the second network device) is carried. This helps the third network device learn of capabilities and features of the second network device. Because the first network device and the second network device are communicatively connected, this helps the third network device further learn of capabilities and features of the first network device according to this embodiment. Therefore, since a terminal device can distinguish between a cell covered by a terrestrial network and a cell covered by a satellite, the following case can be avoided: A delay-sensitive communication service is handed over to the satellite cell. This improves communication quality.

In a possible design, the second network device is configured to forward a signal of the first network device. In the foregoing design, indication information of a relay satellite is sent to the third network device, helping the third network device further learn of an NTN capability of the first network device.

In a possible design, the cell type information further indicates that a neighboring cell is a terrestrial network communication cell or a non-terrestrial network communication cell. In the foregoing design, whether the neighboring cell is a non-terrestrial network communication cell is indicated, helping the third network device further learn of the capabilities and the features of the first network device.

In a possible design, if the cell type information indicates that the cell is a non-terrestrial network communication cell, the cell type information further indicates an orbit type of the second network device, and the orbit type includes a low-earth orbit, a medium-earth orbit, and a geostationary earth orbit. In the foregoing design, orbit information of the relay satellite is indicated, helping the third network device further learn of the NTN capability of the first network device.

In a possible design, the cell type information further indicates that the cell is a moving cell or a fixed cell. In the foregoing design, a type of the satellite cell is indicated, helping the third network device further learn of the NTN capability of the first network device.

In a possible design, the first network device may be a base station, and the third network device may be a core network device.

In a possible design, the first network device is a DU of a base station, and the third network device is a CU of the base station.

In a possible design, the first network device is a first base station, and the third network device is a second base station.

In a possible design, the first network device is a CU-CP, and the third network device is a CU-UP.

According to a third aspect, an embodiment of this application provides a communication apparatus. The apparatus may be a network device, or may be a chip in a network device. The apparatus may include a processing unit, a transceiver unit, and a receiving unit. It should be understood that the sending unit and the receiving unit herein may alternatively be a transceiver unit. When the apparatus is the network device, the processing unit may be a processor, and the sending unit and the receiving unit may be transceivers. The communication device may further include a storage unit, and the storage unit may be a memory. The storage unit is configured to store instructions, and the processing unit executes the instructions stored in the storage unit, so that a first network device performs the method according to any one of the first aspect or the possible designs of the first aspect, or a second network device performs the method according to any one of the second aspect or the possible designs of the second aspect. When the apparatus is the chip in the network device, the processing unit may be a processor, and the sending unit and the receiving unit may be input/output interfaces, pins, circuits, or the like. The processing unit executes the instructions stored in the storage unit, so that the chip performs the method according to any one of the first aspect or the possible designs of the first aspect, or performs the method according to any one of the second aspect or the possible designs of the second aspect. The storage unit is configured to store instructions. The storage unit may be a storage unit (for example, a register or a cache) in the chip, or may be a storage unit (for example, a read-only memory or a random access memory) located outside the chip and in the terminal device.

According to a fourth aspect, an embodiment of this application further provides a computer-readable storage medium. The computer-readable storage medium stores a computer program. When the computer program is run on a computer, the computer is enabled to perform the method according to the first aspect or the second aspect.

According to a fifth aspect, an embodiment of this application further provides a computer program product including a program. When the program is run on a computer, the computer is enabled to perform the method according to the first aspect or the second aspect.

According to a sixth aspect, a communication apparatus is provided. The apparatus includes a processor, a communication interface, and a memory. The communication interface is configured to transmit information, and/or a message, and/or data between the apparatus and another apparatus. The memory is configured to store computer-executable instructions. When the apparatus runs, the processor executes the computer-executable instructions stored in the memory, so that the apparatus performs the method according to any one of the first aspect or the designs of the first aspect, or any one of the second aspect or the designs of the second aspect.

According to a seventh aspect, an embodiment of this application provides a chip. The chip is coupled to a memory, and performs the method according to any one of the first aspect or the possible designs of the first aspect, or any one of the second aspect or the possible designs of the second aspect in embodiments of this application.

According to an eighth aspect, an embodiment of this application provides a chip. The chip includes a communication interface and at least one processor. The processor is run to perform the method according to any one of the first aspect or the designs of the first aspect, or any one of the second aspect or the possible designs of the second aspect in embodiments of this application.

It should be noted that "coupling" in embodiments of this application indicates direct combination or indirect combination of two components.

According to a ninth aspect, an embodiment of this application further provides a communication system including the foregoing first network device, second network device, and third network device.

DESCRIPTION OF EMBODIMENTS

Figure 1:
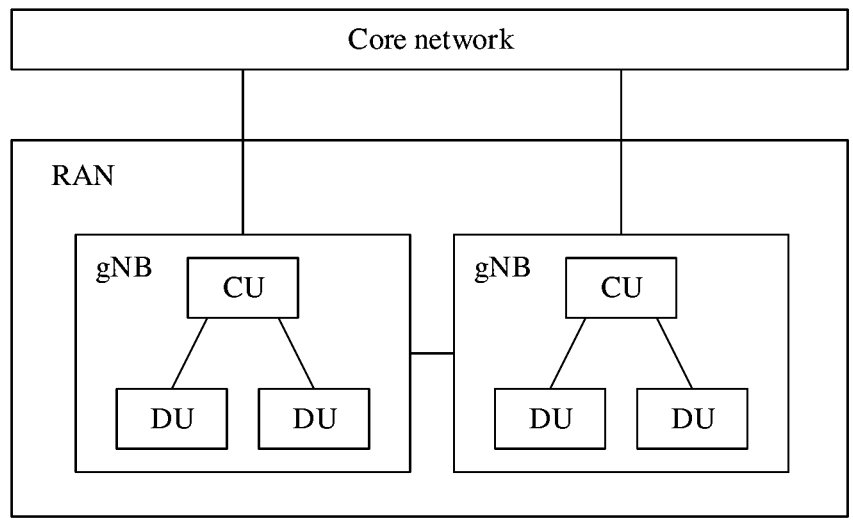
FIG. 1 is a schematic diagram of a structure of a network device according to an embodiment of this application.

In the following, descriptions about some terms are provided in this application, to help a person skilled in the art have a better understanding.

(1) A communication device is a device for data communication by establishing a connection to another device in a communication system. In embodiments of this application, the communication device is a base station, or a core network device (for example, an access and mobility management function (AMF) entity) that can be connected to the base station in a core network. Alternatively, the communication device may include devices having some functions of a base station, for example, a distributed unit (DU) and a central unit (CU), or may be a relay device/an RRU that can be connected to the base station in an access network.

In embodiments of this application, a communication connection needs to be established between two communication devices through a corresponding interface, to connect a terminal device to a DN, for implementation of services of the terminal device. In addition, one of the communication devices has a requirement for frequent/multiple connection establishment. For example, a communication device a needs to repeatedly establish connections to a communication device b, a communication device c, and the like. For example, the communication device a may have high-speed mobility. For example, the communication device a is disposed in a high-speed moving facility such as a satellite, a high-speed railway, a car, a ship, or an airplane. In the following embodiments of this application, an example in which a communication device having high-speed mobility is a satellite is used for description.

(2) Connection between two communication devices is implemented through a corresponding interface. Connections and interfaces between different communication devices are different.

For example, in an LTE communication system (also referred to as a 4G communication system), a connection between two base stations is implemented through an X2 interface, and the connection may be referred to as an X2 connection for short. In a 5G communication system, a connection between two base stations is implemented through an Xn interface, and the connection may be referred to as an Xn connection for short. A connection between the base station and an AMF entity in an evolved packet core (EPC) (also referred to as a 4G core network) is implemented through an N2 interface, and the connection may be referred to as an N2 connection for short. A connection between the base station and an AMF entity in a 5G core (5GC) network is implemented through an Ng interface, and the connection may be referred to as an Ng connection for short. A connection between a DU and a CU is implemented through an F1 interface, and the connection may be referred to as an F1 connection for short.

It should be noted that a connection (or an interface) between two communication devices needs to be maintained by storing configuration information of the peer communication device by the two communication devices. For example, if the communication device a and the communication device b maintain a connection therebetween, the communication device a needs to store configuration information of the communication device b, and the communication device b needs to store configuration information of the communication device a. In this way, the communication device a can send signaling and data to the communication device b based on the configuration information of the communication device b; and the communication device b may send signaling and data to the communication device a based on the configuration information of the communication device a. In embodiments of the present invention, the configuration information may be context information.

(3) Configuration information of a communication device is sent to the peer communication device during connection establishment by the communication device, for interface maintenance by the peer communication device. Configuration information of a communication device varies with an interface between communication devices.

For example, in a scenario of connection establishment between a base station and an AMF entity, the base station needs to receive and store configuration information of the AMF entity, for example, an identifier of the AMF entity, capability information of the AMF entity, a supported public network list, and a supported slice list. The AMF entity also needs to receive and store configuration information of the base station, for example, an identifier of the base station, a name of the base station, tracking area (TA) information supported by the base station, and a default paging cycle.

For example, in a scenario of connection establishment between base stations, both base stations need to receive and store the configuration information of the peer base station, for example, an identifier of the base station, a TA information supported by the base station, information about an AMF entity to which the base station belongs, cell (including a 4G cell and/or a 5G cell) information, and an interface entity indication.

For example, in a scenario of connection establishment between a DU and a CU, the CU needs to receive and store configuration information of the DU sent by the DU, for example, an identifier of the DU, a name of the DU, a cell list managed by the DU, and an RRC version of the DU. The DU needs to receive and store configuration information of the CU, for example, a name of the CU, a to-be-activated cell list, and an RRC version of the CU.

The following describes embodiments of this application with reference to accompanying drawings.

Network elements in embodiments of this application include a network device and a terminal device.

The network device may also be referred to as a communication device. The network device may be an access network device or a core network device. The access network device is an entity for transmitting or receiving signals on a network side, for example, a new generation NodeB (generation NodeB, gNodeB). The access network device may be a device for communication with a mobile device. The access network device may be an AP in a wireless local area network (WLAN), an evolved NodeB (eNB or eNodeB)

in long term evolution (LTE), a relay station, an access point, integrated access and backhaul (IAB), a vehicle-mounted device, a wearable device, an access network device in a future 5G network, an access network device in a future evolved public land mobile network (PLMN) network, or a gNodeB (gNB) in an NR system. In addition, in embodiments of this application, the access network device provides services for a cell, and the terminal device communicates with the access network device using a transmission resource (for example, a frequency domain resource or a spectrum resource) used by the cell. The access network device in embodiments of this application may be a central unit (CU) or a distributed unit (DU). Alternatively, the access network device may include a CU and a DU, for example, which are shown in FIG. 1. The CU and the DU may be physically separated, or may be deployed together. This is not specifically limited in embodiments of this application. One CU may be connected to one DU, or a plurality of DUs may share one CU to reduce costs and facilitate network expansion. CU-DU division may be performed by protocol stacks. In a possible manner, a radio resource control (RRC) layer, a service data adaptation protocol (SDAP) stack, and a packet data convergence protocol (PDCP) layer are deployed on the CU. A radio link control (RLC) layer, a media access control (MAC) layer, and a physical layer are deployed on the DU. In the present invention, the foregoing protocol stack division manner is not completely limited, and there may be another division manner. The CU is connected to the DU through an F1 interface. The CU representing a gNB is connected to a core network through an Ng interface. The access network device in embodiments of this application may be a central unit control plane (CU-CP) node or a central unit user plane (CU-UP) node, or the network device may include a CU-CP and a CU-UP. The CU-CP is responsible for a control plane function, and mainly includes RRC and PDCP-C. The PDCP-C is mainly responsible for control plane functions such as data encryption and decryption, integrity protection, and data transmission. The CU-UP is responsible for user plane functions, and mainly includes SDAP and PDCP-U. The SDAP is mainly responsible for processing data of the core network and mapping flows to bearers. The PDCP-U is mainly responsible for data plane functions such as data encryption and decryption, integrity protection, header compression, serial number maintenance, and data transmission. The CU-CP is connected to the CU-UP through an E1 interface. The CU-CP representing a gNB is connected to the core network through an Ng interface, and connected to the DU through an F1-C (the control plane). The CU-UP is connected to the DU through an F1-U (the user plane). Certainly, in another possible implementation, the PDCP-C is also on the CU-UP. The access network device mentioned in embodiments of this application may be a device including a CU or a DU, a device including a CU and a DU, or a device including a control plane CU node (a CU-CP node), a user plane CU node (a CU-UP node), and a DU node. In addition, in another possible case, the access network device may be another apparatus that provides a wireless communication function for the terminal device. A specific technology and a specific device form used for the access network device are not limited in embodiments of this application. For ease of description, in embodiments of this application, an apparatus that provides a wireless communication function for the terminal device is referred to as an access network device.

The terminal device may be a wireless terminal device capable of receiving scheduling and indication information of the access network device. The wireless terminal device may be a device that provides users with voice and/or data connectivity, a handheld device with a wireless connection function, or another processing device connected to a wireless modem. The wireless terminal device may communicate with one or more core networks or the Internet through a radio access network (RAN). The wireless terminal device may be a mobile terminal device, for example, a mobile phone (which is also referred to as a "cellular" phone or a mobile phone), a computer, and a data card. For example, the wireless terminal device may be a portable, pocket-sized, handheld, computer built-in, or vehicle-mounted mobile apparatus that exchanges language and/or data with the radio access network. For example, the terminal device may be a device such as a personal communication service (PCS) phone, a cordless phone, a session initiation protocol (SIP) phone, a wireless local loop (WLL) station, a personal digital assistant (PDA), a tablet computer (Pad), or a computer with a wireless transceiver function. The wireless terminal device may also be referred to as a system, a subscriber unit, a subscriber station, a mobile station (MS), a remote station, an access point (AP), a remote terminal device, an access terminal device, a user terminal device, a user agent, a subscriber station (SS), customer premises equipment (CPE), a terminal, user equipment (UE), a mobile terminal (MT), or the like. Alternatively, the wireless terminal device may be a wearable device and a next-generation communication system, for example, a terminal device in a 5G network, a terminal device in a future evolved PLMN network, or a terminal device in a new radio (NR) communication system.

In addition, embodiments of this application are also applicable to another future-oriented communication technology. Network architectures and service scenarios described in this application are intended to describe the technical solutions in this application more clearly, and do not constitute any limitation on the technical solutions provided in this application. A person of ordinary skill in the art may know that, with evolution of network architectures and emergence of new service scenarios, the technical solutions provided in this application are also applicable to similar technical problems.

It should be noted that a type and a standard of the foregoing communication system are not limited in embodiments of this application. For example, the communication system may be a 5th Generation (5G) communication system, a long term evolution (LTE) communication system, or the like.

Embodiments of this application may be applied to a fourth-generation mobile communication system (the fourth generation, 4G) system, a 5G system, an NTN system, vehicle to everything (V2X), long term evolution-vehicle (LTE-vehicle, LTE-V), vehicle to vehicle (V2V), Internet of Vehicles, machine type communication (MTC), and Internet of Things (IoT), long-term evolution machine to machine (LTE-machine to machine, LTE-M), machine-to-machine (M2M), Internet of Things, or a future mobile communication system.

In a possible application scenario, the NTN system may include a satellite system. Based on satellite altitudes, namely, satellite orbit altitudes, the satellite system may include: a high elliptical orbit (HEO) satellite, a geostationary (geostationary earth orbit, GEO) satellite, a medium orbit (medium-earth orbit, MEO) satellite, and a low-earth orbit (LEO) satellite. In addition, the NTN system may further include an air network device, for example, a high altitude platform station (HAPS) communication system. The network device in the present invention is not limited to the foregoing examples.

As an example, a mechanism in which the GEO satellite and the LEO satellite provide coverage for a cell is briefly described as follows:

(1) GEO satellite, also referred to as a geostationary satellite, moves at a same speed as an Earth's rotation system, and thus appears motionless to ground observers. Correspondingly, a GEO satellite cell is also stationary. A coverage area of the GEO satellite cell is large, typically with a diameter of 500 km.

2. LEO satellite is a typical representative of many types of non-geostationary satellites. The LEO satellite moves fast relative to the ground, at a speed of about 7 km/s. Coverage area of the LEO satellite moves accordingly. There are two modes of cells projected by the LEO satellite to the ground: a fixed cell and a moving cell.

Figure 2:
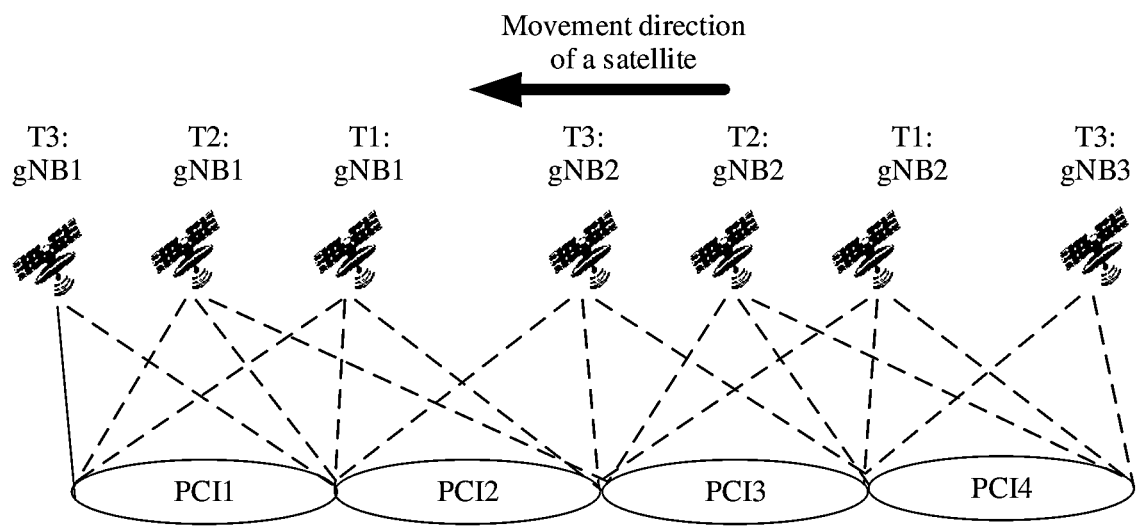
FIG. 2 is a schematic diagram of a fixed cell according to an embodiment of this application.

Fixed cell: A cell projected onto the ground is fixed relative to the ground. The LEO satellite above the ground covers a location on the ground by adjusting its antenna angle, and another LEO satellite covers the same location on the ground when the location is beyond coverage of the LEO satellite. As shown in FIG. 2, fixed cells are mapped as follows: Locations of the cells are fixed on the ground, and these cells are formed by adjusting beams of the moving satellite. For example, at a moment T1, a cell 1 and a cell 2 are covered by a beam of a gNB1, and a cell 3 and a cell 4 are covered by a beam of a gNB2. At a moment T2, although both the gNB1 and the gNB2 move leftward, beams of the gNB1 and the gNB2 can still be adjusted to ensure coverage of the cell 1, the cell 2, the cell 3, and the cell 4. At a moment T3, compared with the moment T1, as the gNB1 and the gNB2 have moved far enough, the gNB1 cannot provide coverage for the cell 2 by adjusting the beam, and the gNB2 cannot provide coverage for the cell 4 by adjusting the beam. In this case, the gNB2 can provide coverage for the cell 2, and the gNB3 can provide coverage for the cell 4 instead.

Figure 3:
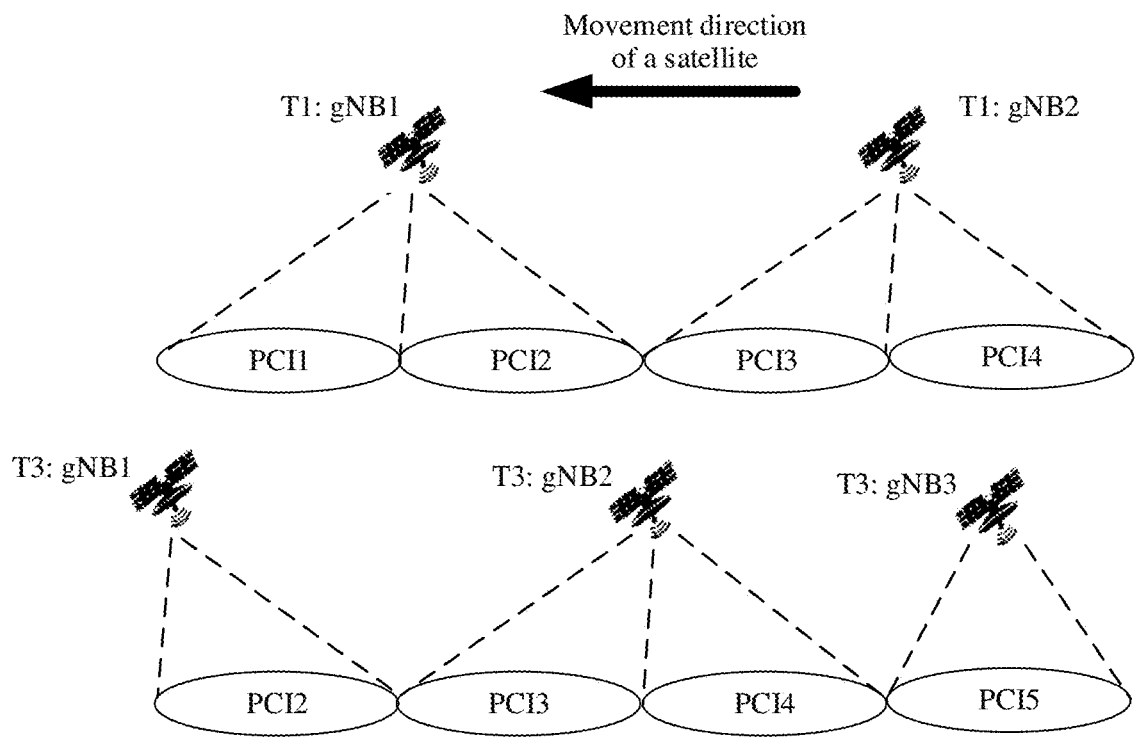
FIG. 3 is a schematic diagram of a moving cell according to an embodiment of this application.

Moving cell: A cell projected onto the ground moves along with the LEO satellite. During the movement, an antenna direction of the LEO satellite remains unchanged. For example, an antenna of the LEO satellite keeps perpendicular to the ground. As shown in FIG. 3, an earth moving cell is mapped as follows: A moving satellite does not dynamically adjust its beam direction, instead a beam generated by the moving satellite moves on the ground accordingly with movement of the satellite. For example, at the moment T1, an area shown in FIG. 2 is covered by the cell 1, the cell 2, the cell 3, and the cell 4 of the gNB1 and the gNB2; and at the moment T3, the area is covered by the cell 2, the cell 3, the cell 4, and a cell 5 of the gNB1, the gNB2, and a gNB3.

The following separately describes each application scenario in detail with reference to the accompanying drawings.

Figure 4:
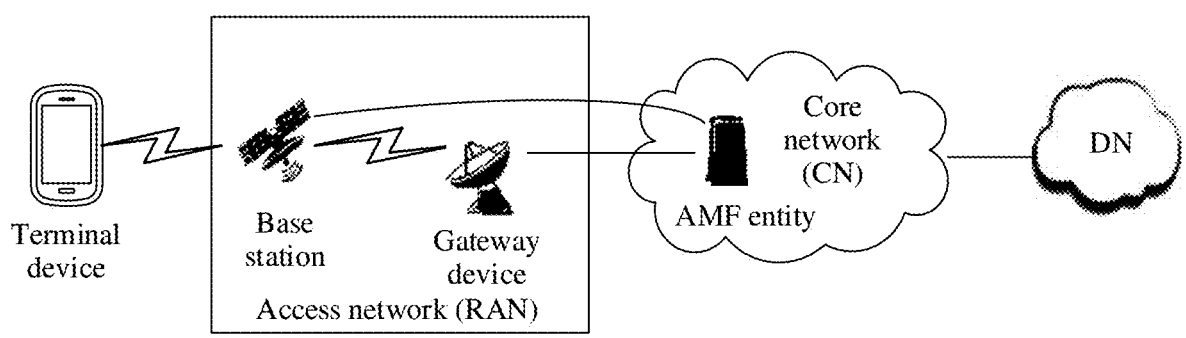
FIG. 4 is a schematic diagram of an NTN application scenario according to an embodiment of this application.

For example, in an application scenario shown in FIG. 4, a satellite, serving as a base station, may establish an N2 or Ng connection to an AMF entity in a core network, to provide a radio access service for a terminal device.

Figure 5:
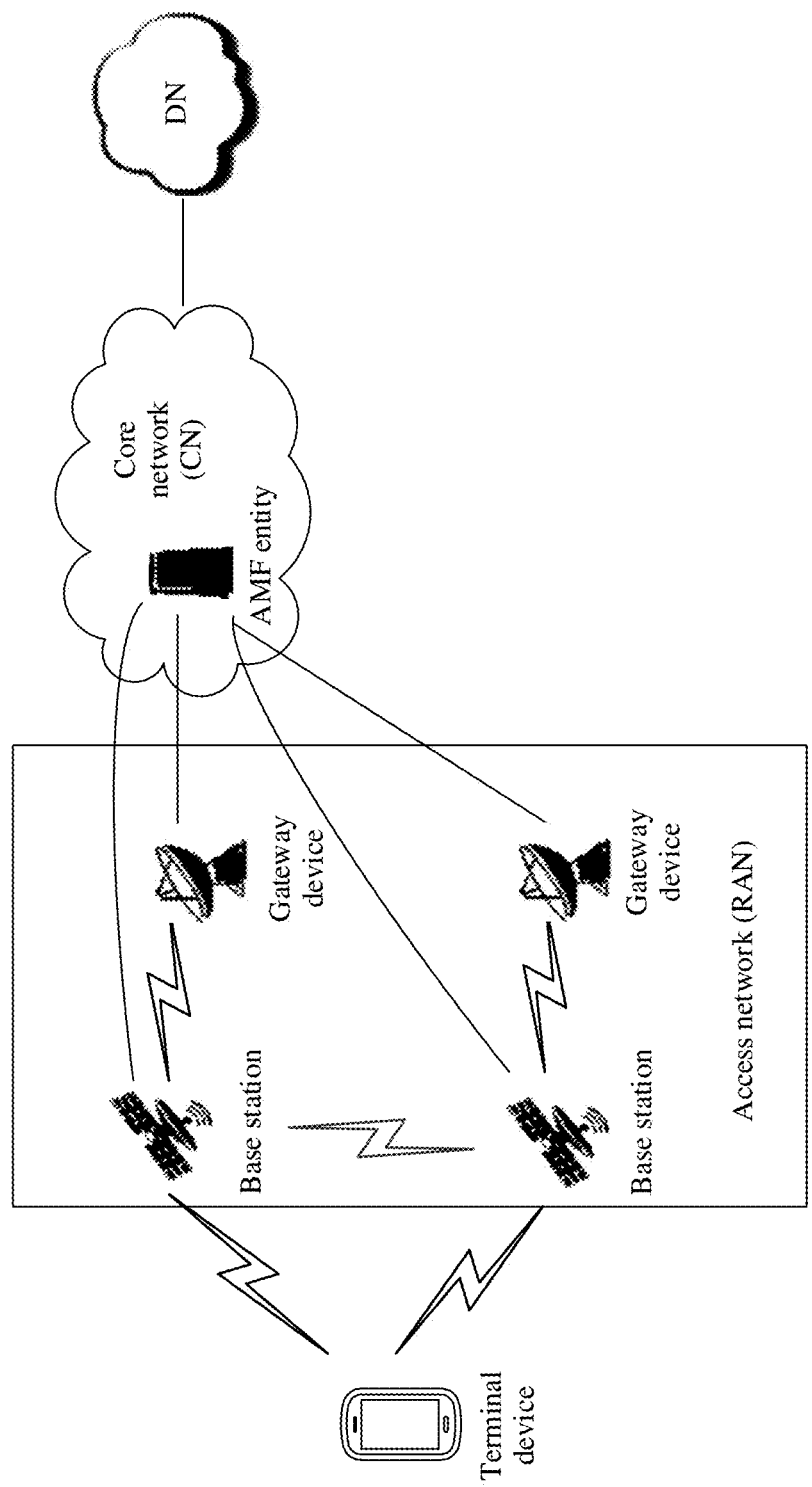
FIG. 5 is a schematic diagram of another NTN application scenario according to an embodiment of this application.

For example, in a communication system, an X2 or Xn connection may be established between two base stations in a RAN, for cell information and data transmission, so as to implement cell reselection and handover of the terminal device. For example, the two base stations that establish a connection in the RAN may be: a satellite serving as a base station and a satellite serving as a base station, a satellite serving as a base station and a conventional base station, a base station including a plurality of partial functions and a conventional base station, or a base station including a plurality of partial functions and a satellite serving as a base station. In an application scenario shown in FIG. 5, a connection may be established between two satellites serving as base stations, for data and signaling exchange.

Figure 6A:
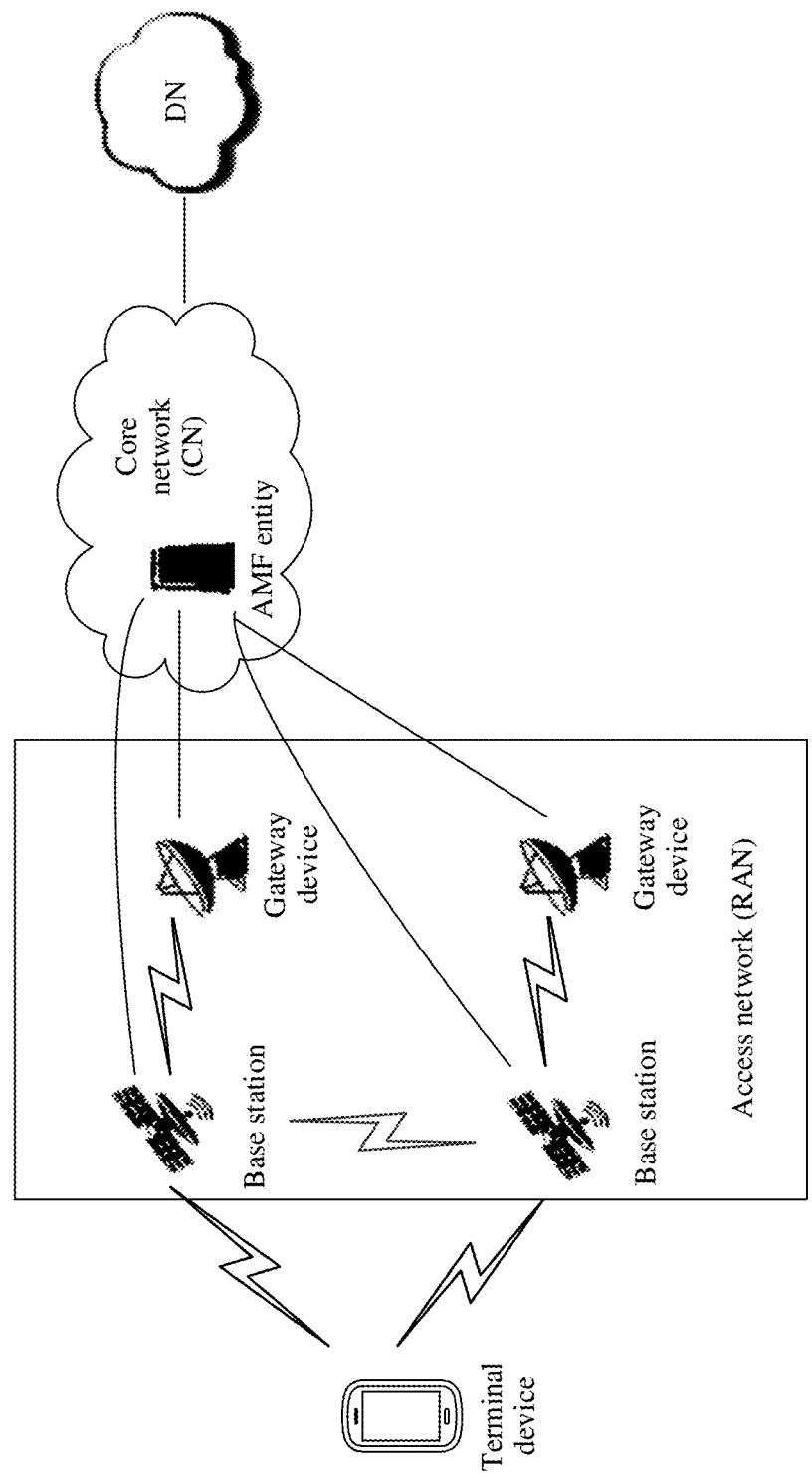
FIG. 6A is a schematic diagram of another NTN application scenario according to an embodiment of this application.
Figure 6B:
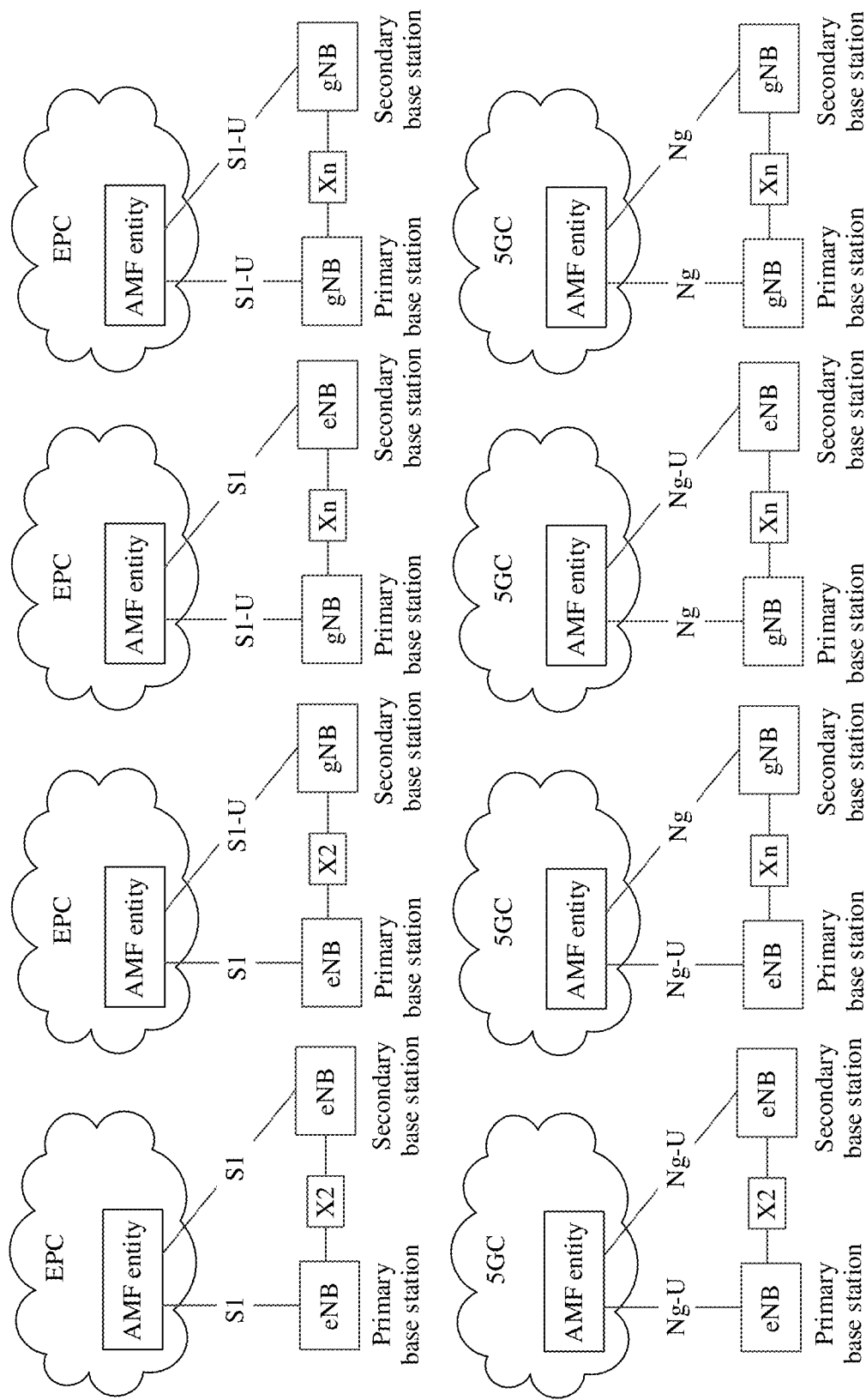
FIG. 6B is a schematic diagram of interfaces according to an embodiment of this application.

For example, in a communication system supporting carrier aggregation, a dual-connectivity (DC) technology may be used for implementation, to provide a higher rate for users and improve spectral efficiency. In the communication system, a terminal device supporting dual-connectivity may be connected to two base stations, to increase a throughput rate of a single user. As shown in FIG. 6A, a connection also needs to be established, through a corresponding interface, between the two base stations connected to the terminal device, for data and signaling exchange. It should be noted that one of the two base stations connected to the terminal device is served as a primary base station, and the other is served as a secondary base station. As shown in a schematic diagram of interfaces in FIG. 6B, an interface between an AMF entity and a base station and an interface between two base stations vary accordingly when the base stations are connected to different core networks and types of the base stations are different.

Figure 7:
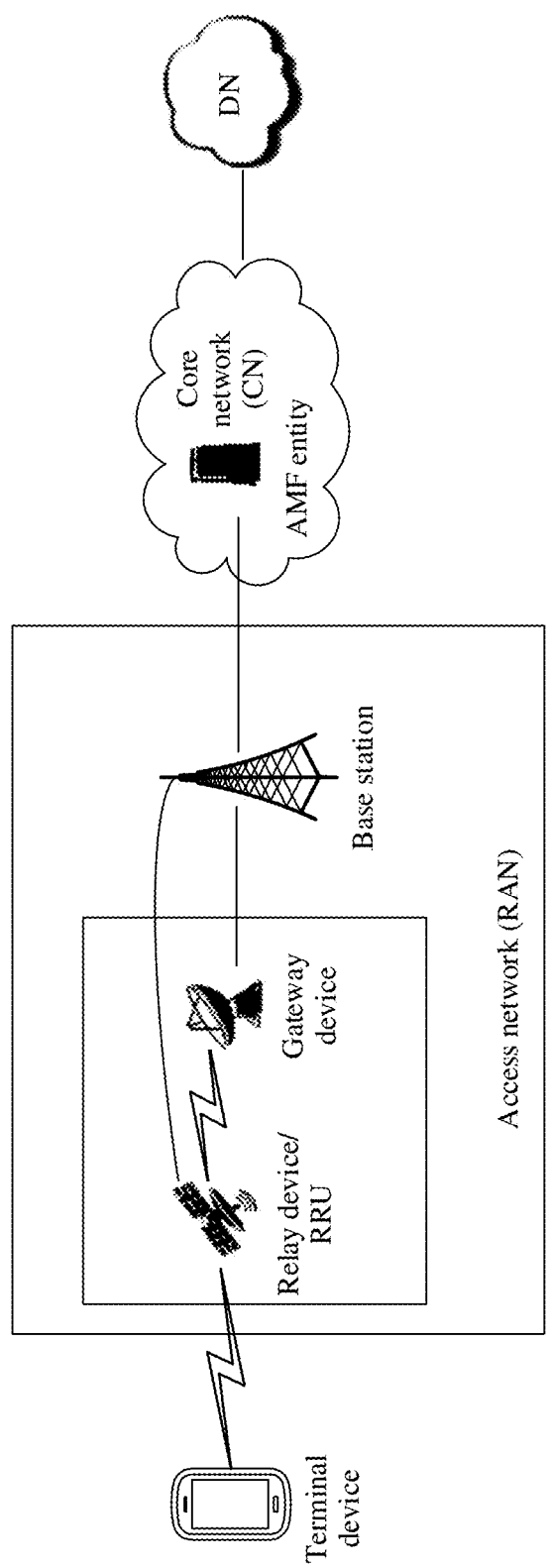
FIG. 7 is a schematic diagram of another NTN application scenario according to an embodiment of this application.

For example, in an application scenario shown in FIG. 7, a satellite may alternatively be served as a relay device between a terminal device and a base station or served as a remote radio unit (RRU) of a base station. In this scenario, the satellite is mainly responsible for an L1 relay, for physical layer forwarding, which is invisible to an upper layer.

Figure 8:
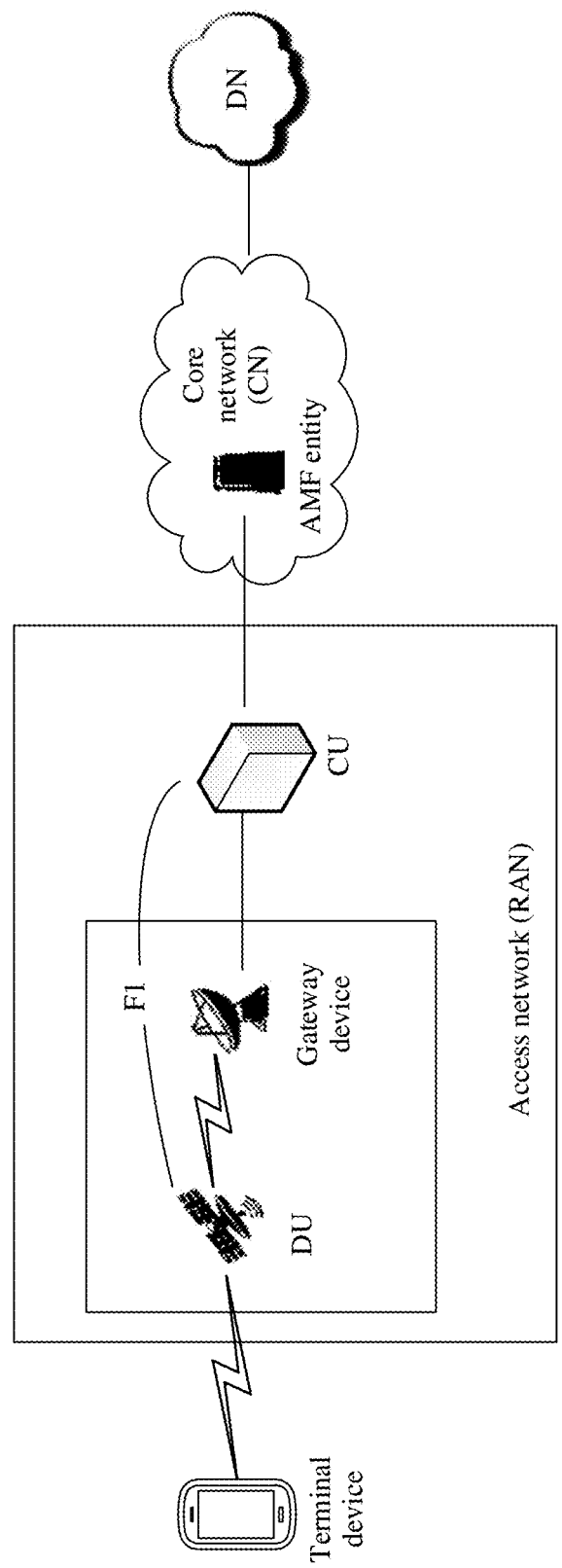
FIG. 8 is a schematic diagram of another NTN application scenario according to an embodiment of this application.

For example, in an application scenario shown in FIG. 8, a base station in a RAN is split into two functional parts: a DU and a CU, where a satellite may be served as the DU. In this application scenario, an interface between the DU and the CU is an F1 interface.

It should be further noted that the application scenarios shown in FIG. 4, FIG. 5, FIG. 6A, FIG. 6B, FIG. 7, and FIG. 8 are only example application scenarios to which this application is applicable. In the foregoing examples, that a communication device that needs to establish a connection for a plurality of times is a satellite is only an example.

In an NTN system, there are two types of satellite communication architectures: a transparent forwarding architecture and a regenerative architecture. In the former case, a satellite functions only as a relay or an amplifier for radio frequency filtering, amplification, and signal regeneration. In the latter case, a satellite functions as a gNB, a distributed unit (DU), or a relay, where this relay is different from the relay in the former case. The relay is also capable of signal processing, and thus the relay is similar to an integrated access and backhaul (IAB) node or another relay node. When the satellite is served as a gNB, a DU, an IAB, or another relay node, functions of the satellite is similar to functions of a common gNB, DU, IAB, or another relay node.

The NTN communication system provides seamless coverage for a terminal device by deploying an access network device or some functions of the access network device on a non-terrestrial device (for example, a high altitude platform station or a satellite). Because the non-terrestrial device is less susceptible to natural disasters, reliability of the communication system can be improved. For ease of description and understanding of solutions in embodiments of this application, an NTN communication system in which an access network device is deployed on a satellite is used as an example for description in this application. In addition, for ease of description, "an access network device on a satellite"

is hereinafter replaced with "a satellite" in this application. In other words, communication between a terminal device and a satellite described in this application actually refers to communication between the terminal device and an access network device on the satellite. Unified descriptions are provided herein, and details are not described below again.

In satellite communication, a signal of a terrestrial base station connected to a satellite is forwarded by the satellite. After being forwarded by the satellite, the signal of the terrestrial base station connected to the satellite, different from a signal of a common terrestrial base station, has features such as wide coverage and a long delay. Such differences greatly affect services of UE, and further affect handover decision and the like. Currently, UE cannot distinguish between a cell covered by the terrestrial base station and a cell covered by the satellite during cell handover. As a result, the UE may select an inappropriate cell during cell handover. For example, when performing a delay-sensitive communication service, the UE selects the cell covered by the satellite, resulting in poor communication quality and poor user experience.

Based on this, embodiments of this application provide an NTN communication method and an apparatus, to resolve the following problem: When performing a delay-sensitive communication service, UE may select a cell covered by a satellite since the UE cannot distinguish between a cell covered by a terrestrial base station and the cell covered by the satellite. The method and an apparatus are based on a same inventive concept. Because the method and the apparatus have a similar problem-resolving principle, for implementations of the apparatus and the method, refer to each other, and no repeated description is provided.

It should be understood that, in embodiments of this application, "at least one" means one or more, and "a plurality of" means two or more. The term "and/or" describes an association relationship between associated objects, and represents that three relationships may exist. For example, A and/or B may represent any one of the following cases: Only A exists, both A and B exist, or only B exists, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one of a, b, or c may represent: a, b, c, a and b, a and c, b and c, or a, b, and c, where a, b, and c may be singular or plural.

It should be understood that, in descriptions of this application, terms such as "first" and "second" are merely used for a purpose of distinguishing for description, and should not be construed as indicating or implying relative importance, nor as indicating or implying a sequence.

It should be noted that, in embodiments of this application, "a cell covered by a second network device" may be understood as a cell projected onto ground by a first network device, or may be understood as a cell projected onto ground by a first network device by forwarding a signal through relaying via a second network device. It should be understood that, in embodiments of this application, "a cell covered by a second network device", "a cell projected onto ground by a first network device", and "a cell projected onto ground by a first network device by forwarding a signal through relaying via a second network device" are understood as a same meaning.

The following describes in detail the NTN communication method provided in this application with reference to the accompanying drawings.

Figure 9:
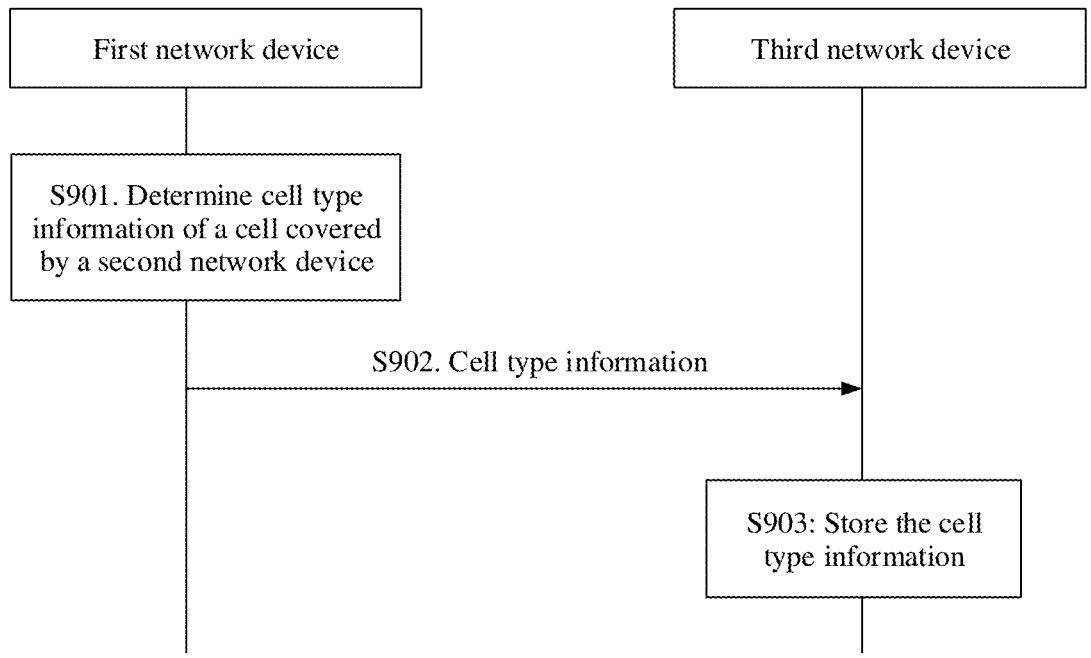
FIG. 9 is a schematic flowchart of an NTN communication method according to an embodiment of this application.

FIG. 9 shows an NTN communication method according to an embodiment of this application. The NTN communication method provided in this application may be applied to a scenario of a terrestrial base station connected to a satellite for initial interface (NG/XN/F1/E1) setup or configuration update in an NTN. The NTN communication method may specifically include the following steps.

S901. A first network device determines cell type information of a cell covered by a second network device, where the cell type information indicates that the cell is a terrestrial network communication cell or a non-terrestrial network communication cell (or may be referred to as a satellite cell).

The second network device may be configured to forward a signal of the first network device. Alternatively, it may be understood as that the second network device is a relay device providing a relay forwarding service for the first network device. It may be understood that, if the cell covered by the second network device is a terrestrial network communication cell, the second network device is a terrestrial base station, and the first network device is connected to the terrestrial base station. If the cell covered by the second network device is a non-terrestrial network communication cell, the second network device is a non-terrestrial base station (for example, a satellite), and the first network device is connected to the satellite.

It may be understood that the cell covered by the second network device is formed by the second network device by transparently transmitting the signal of the first network device. Therefore, the cell covered by the second network device may also be understood as a cell covered by the first network device.

For example, a non-terrestrial communication device may include but is not limited to a satellite, aircraft, an air workstation, a hot air balloon, and the like. In a possible implementation, if the cell covered by the second network device is a non-terrestrial network communication cell, that is, the second network device is a non-terrestrial communication device, the cell type information may further indicate a type of the second network device, for example, indicate that the second network device is a satellite, and for another example, indicate that the second network device is an air workstation.

If the cell covered by the second network device is a non-terrestrial network communication cell, the cell type information may further indicate an orbit type of the second network device, where the orbit type includes an MEO, a GEO, and an LEO. In an example, the cell type information may indicate whether the second network device is a GEO satellite, an MEO satellite, or an LEO satellite.

In addition, the cell type information may further indicate that the cell is a moving cell or a fixed cell.

In an implementation, the cell type information may further include cell information of a corresponding cell. The cell information may include but is not limited to at least one of the following: a cell global identifier (CGI), a physical cell identifier (PCI), and a cell frequency of the cell.

In an implementation, the cell type information may further indicate that a neighboring cell is a terrestrial network communication cell or a non-terrestrial network communication cell. The neighboring cell may be a neighboring cell of the cell covered by the first network device, or may be a neighboring cell of a cell formed by the second network device by transparently transmitting the signal of the first network device (that is, the cell covered by the second network device).

For example, if the neighboring cell is a non-terrestrial network communication cell, the neighboring cell may be a cell covered by a non-terrestrial communication device serving as a base station, or the neighboring cell may be a cell formed by a non-terrestrial communication device serving as a relay device by transparently transmitting a signal of another base station.

In addition, if the neighboring cell is a non-terrestrial network communication cell, the cell type information may further indicate an orbit type of the neighboring cell.

The cell type information may further indicate that the neighboring cell is a moving cell or a fixed cell.

The cell type information may further indicate cell information of the neighboring cell.

In an implementation, for a manner in which the cell type information indicates that the neighboring cell is a terrestrial network communication cell or a non-terrestrial network communication cell, the cell type information indicates the orbit type of the neighboring cell, the cell type information indicates that the neighboring cell is a moving cell or a fixed cell, and the cell type information indicates the cell information of the neighboring cell, refer to related descriptions in which the cell type information indicates that the cell covered by the second network device is a terrestrial network communication cell or a non-terrestrial network communication cell, the cell type information indicates the orbit type of the cell covered by the second network device, the cell type information indicates that the cell covered by the second network device is a moving cell or a fixed cell, and the cell type information indicates the cell information of the cell covered by the second network device. Details are not described herein again.

S902. The first network device sends the cell type information to a third network device. Correspondingly, the third network device receives the cell type information sent by the first network device.

In an example, the first network device may be a centralized base station, or may be a distributed base station. If the first network device is a distributed base station, the first network device may be specifically a CU, and further may be a CU-CP. The third network device may be a core network device, for example, an AMF; may be a terrestrial communication device, for example, a terrestrial base station; or may be another communication device that establishes an interface connection to the first network device. Details are not described herein one by one.

In another example, the first network device may be a DU, and the third network device may be a CU, and specifically may be a CU-CP.

In still another example, the first network device may be a CU-CP, and the third network device may be a CU-UP.

In an implementation, when sending the cell type information to the third network device, the first network device may explicitly send the cell type information. For example, the first network device sends, to the third network device, a message carrying the cell type information.

In another implementation, when sending the cell type information to the third network device, the first network device may implicitly send the cell type information. For example, the first network device sends, to the third network device, indication information indicating a communication connection relationship of the first network device.

For example, the communication connection relationship of the first network device may include at least one of the following: connected to Transparent LEO with fixed cell, connected to Transparent LEO with moving cell, connected to Transparent GEO, connected to Transparent MEO, connected to LEO with fixed cell, connected to LEO with moving cell, connected to GEO, connected to MEO, connected to a terrestrial base station, connected to an air workstation, connected to a hot air balloon, and the like.

S903. The third network device stores the cell type information.

In an implementation, after storing the cell type information, the third network device may send, to the first network device, a response message, indicating that the third network device has already stored the cell type information.

In a possible implementation, after step S903, the third network device may send, to the first network device, an acknowledgment message, notifying the first network device that the third network device has already stored the cell type information.

In an NTN scenario in this embodiment, when the first network device establishes an interface connection to the third network device, a related NTN indication (to be specific, the cell type information of the second network device) is carried. This helps the third network device further learn of capabilities and features of the first network device.

To better understand the NTN communication method provided in embodiments of this application, the following provides descriptions with reference to a specific scenario. It should be understood that interfaces in the following scenarios are only examples for description, and an interface between the first network device and the third network device is not specifically limited.

Scenario 1: The first network device initially establishes an interface connection to the third network device. It is assumed that the first network device is a terrestrial base station connected to an LEO satellite, meaning that the second network device is the LEO satellite. The third network device may be a core network device (for example, an AMF), or may be an access network device (for example, a terrestrial base station).

Figure 10:
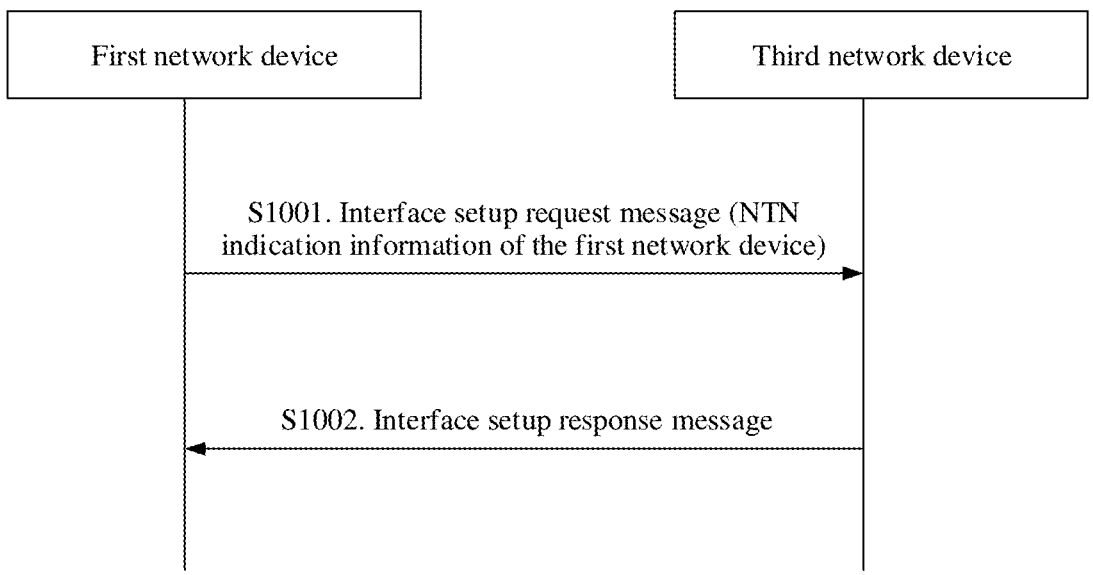
FIG. 10 is a schematic diagram of an interface setup procedure according to an embodiment of this application.

As shown in FIG. 10, a procedure in which the first network device establishes an interface connection to the third network device is as follows.

S1001. The first network device sends an interface setup request message to the third network device, where the interface setup request message carries NTN indication information of the first network device, and the NTN indication information indicates cell type information of a cell projected onto ground by the first network device.

In an example, the interface setup request message is named differently in different interface connection scenarios. For example, in an NG interface connection scenario, the interface setup request message may be named NG SETUP REQUEST. In an Xn interface connection scenario, the interface setup request message may be named Xn SETUP REQUEST. In an F1 interface connection scenario, the interface setup request message may be named F1 SETUP REQUEST. In an E1 interface connection scenario, the interface setup request message may be named E1 SETUP REQUEST.

For example, the first network device is a base station, the third network device is an AMF, an NG interface is set up between the first network device and the third network device, and the first network device may send NG SETUP REQUEST to the third network device. The first network device may be a centralized base station, or may be a distributed base station. If the first network device is a distributed base station, the first network device may be specifically a CU, and further may be a CU-CP.

For another example, the first network device is a base station, the third network device is a base station, an Xn interface is set up between the first network device and the third network device, and the first network device may send Xn SETUP REQUEST to the third network device. The first network device and the second network device may be centralized base stations, or may be distributed base stations. If the first network device and the second network device are both distributed base stations, the first network device and the second network device may be specifically CUs, and further may be CU-CPs.

For still another example, the first network device is a DU, the third network device is a CU, an F1 interface is set up between the first network device and the third network device, and the first network device may send F1 SETUP REQUEST to the third network device, and the third network device may be specifically a CU-CP.

For another example, the first network device may be a CU-CP, the third network device may be a CU-UP, an E1 interface is set up between the first network device and the third network device, and the first network device may send E1 SETUP REQUEST to the third network device.

It may be understood that the cell projected onto the ground by the first network device may be understood as a cell covered by the first network device, or may be understood as a cell covered by the second network device (namely, an LEO satellite). The first network device is a terrestrial base station connected to the LEO satellite, and a signal of the first network device is forwarded and projected onto the ground by the LEO satellite. Therefore, the cell projected onto the ground by the first network device is a satellite cell.

For example, the NTN indication information may indicate that the cell projected onto the ground by the first network device is the satellite cell, and an orbit type of the satellite is an LEO. In addition, the NTN indication information may further indicate whether the cell is a fixed cell or a moving cell.

In an example, the NTN indication information of the first network device may be cell-level information. For example, when the third network device is a terrestrial base station, the first network device may send the cell-level NTN indication information to the third network device. For another example, when the first network device is the DU, and the third network device is the CU, the first network device may send the cell-level NTN indication information to the third network device. For still another example, when the first network device is the CU-CP, and the third network device is the CU-UP, the first network device may send the cell-level NTN indication information to the third network device.

For example, there are three cells projected onto the ground by the first network device (cells projected onto the ground by the first network device by forwarding the signal through relaying via the second network device). The NTN indication information may include: a cell 1 connected to transparent LEO with a fixed cell, a cell 2 connected to transparent GEO, and a cell 3 connected to Transparent LEO with a moving cell.

For example, the NTN indication information may further indicate that a neighboring cell is a terrestrial network communication cell or a non-terrestrial network communication cell.

If the neighboring cell is a non-terrestrial network communication cell, the NTN indication information may further indicate an orbit type of the neighboring cell.

The NTN indication information may further indicate that the neighboring cell is a moving cell or a fixed cell.

The NTN indication information may further indicate cell information of the neighboring cell.

S1002. The third network device sends an interface setup response message to the first network device. The interface setup response message may indicate that the third network device receives the indication information.

In an example, the interface setup response message is named differently in different interface connection scenarios. For example, in the NG interface connection scenario, the interface setup response message may be named NG SETUP RESPONSE. In the Xn interface connection scenario, the interface setup response message may be named Xn SETUP RESPONSE. In the F1 interface connection scenario, the interface setup response message may be named F1 SETUP RESPONSE. In the E1 interface connection scenario, the interface setup response message may be named E1 SETUP RESPONSE.

For example, the first network device is the base station, the third network device is the AMF, the NG interface is set up between the first network device and the third network device, and the third network device may send an NG SETUP RESPONSE to the first network device. The first network device may be the centralized base station, or may be the distributed base station. If the first network device is a distributed base station, the first network device may be specifically the CU, and further may be the CU-CP.

For another example, the first network device is the base station, the third network device is the base station, the Xn interface is set up between the first network device and the third network device, and the third network device may send an Xn SETUP RESPONSE to the first network device. The first network device and the second network device may be the centralized base stations, or may be the distributed base stations. If the first network device and the second network device are distributed base stations, the first network device and the second network device may be specifically the CUs, and further may be the CU-CPs.

For still another example, the first network device is the DU, the third network device is the CU, the F1 interface is set up between the first network device and the third network device, and the third network device may send an F1 SETUP RESPONSE to the first network device. The third network device may be specifically the CU-CP.

For another example, the first network device may be the CU-CP, the third network device may be the CU-UP, the E1 interface is set up between the first network device and the third network device, and the third network device may send an E1 SETUP RESPONSE to the first network device.

Optionally, the interface setup response message may also carry the indication information.

In an implementation, the interface setup response message may further carry an NTN-related capability of the third network device. For example, the third network device is connected to another regenerative gNB. This implementation can help the first network device learn of capabilities and features of the third network device.

Scenario 2: Configuration information of the first network device changes.

It is assumed that the first network device is a terrestrial base station connected to an LEO satellite, meaning that the second network device is the LEO satellite. The third network device may be a core network device (for example, an AMF), or may be an access network device (for example, a terrestrial base station).

Figure 11:
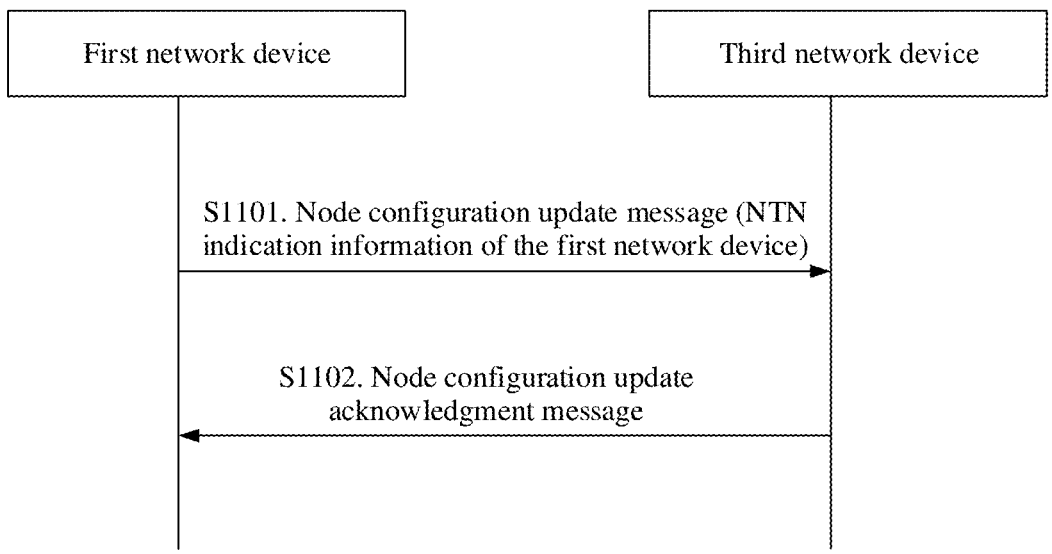
FIG. 11 is a schematic diagram of a configuration update procedure according to an embodiment of this application.

As shown in FIG. 11, a procedure in which the first network device updates the configuration information is as follows.

S1101. The first network device sends a node configuration update message to a third network device, where the node configuration update message carries NTN indication information of the first network device, and the NTN indication information indicates cell type information of a cell projected onto ground by the first network device.

For details of the NTN indication information, refer to related descriptions of the NTN indication information in Scenario 1. Details are not described herein again.

For example, the node configuration update message may be named Node configuration update.

In some embodiments, that configuration information of the first network device changes may mean that a relay device connected to the first network device changes. For example, an orbit type of the relay device changes. For example, the relay device changes from an LEO to an MEO. Alternatively, a mode of the relay device changes, for example, changes from a fixed cell to a moving cell. Alternatively, a type of the relay device changes. For example, the relay device changes from one of the following five devices to another of the following five devices: an LEO satellite, an MEO satellite, a GEO satellite, another non-terrestrial communication device (for example, a communication device capable of serving as a relay device, such as an aircraft, an air workstation, or a hot air balloon), and a terrestrial base station. Alternatively, the first network device changes from being connected to a relay device to being not connected to a relay device.

In a possible implementation, the node configuration update message may carry the full NTN indication information.

In another possible implementation, the first network device initiates differentiated configuration (for example, delta configuration) to the third network device. To be specific, the node configuration update message may carry a change amount of updated NTN indication information compared with the NTN indication information before updating.

S1102. The third network device sends a node configuration update acknowledgment message to the first network device. The node configuration update acknowledgment message indicates that the third network device completes updating of the configuration information of the first network device.

For example, the node configuration update acknowledgment message may be named Node configuration update acknowledge.

In an implementation, if the third network device does not support the updated configuration information of the first network device, the third network device may further send a failure indication to the first network device. Optionally, the failure indication may be included in a node configuration update failure message.

In the foregoing scenario 1 and scenario 2, the terrestrial network base station that relays the signal via the satellite may send an NTN indication to the AMF (to be specific, the cell type information of the cell that is projected onto a terrestrial network by the terrestrial network base station via a satellite relay), helping the AMF further learn of capabilities and features of the terrestrial network base station. Further, when configuring a quality of service (QOS) parameter for UE in communication with the terrestrial network base station, the AMF may make related adjustment, for example, increase a delay, increase a tolerable maximum packet loss rate, or increase a priority, to help the UE obtain a better service and user experience under signal coverage of the terrestrial network base station.

Alternatively, a first terrestrial base station that relays a signal via a satellite may send an NTN indication of the first terrestrial base station to a second terrestrial base station (to be specific, cell type information of a cell that is projected onto the ground by the first terrestrial base station via the satellite relay), helping the second terrestrial base station further learn of capabilities and features of the first terrestrial base station. Further, when making a cell handover decision, the second terrestrial base station may determine, based on the NTN indication of the first terrestrial base station, whether to disable some cells or change signal directions or transmit power of some cells. For example, when making a cell handover decision for delay-sensitive UE, the second terrestrial base station may disable a cell that is projected onto the ground by the first terrestrial base station via the satellite relay, to avoid a case in which the UE is handed over to a satellite cell with a long delay. This helps the UE obtain better service continuity and signal quality.

Figure 12:
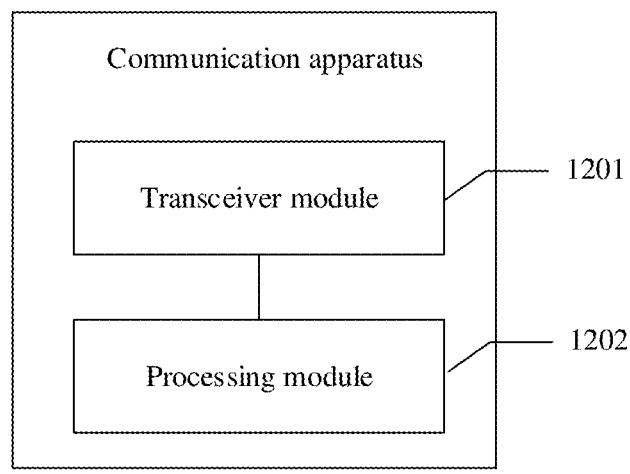
FIG. 12 is a schematic diagram of a structure of an NTN communication apparatus according to an embodiment of this application.

Based on a same inventive concept as the method embodiments, an embodiment of this application provides a communication apparatus. A structure of the communication apparatus may be shown in FIG. 12. The communication apparatus includes a transceiver module 1201 and a processing module 1202.

In a specific implementation, the communication apparatus may be specifically configured to implement the method performed by the first network device in embodiments in FIG. 9 to FIG. 11. The apparatus may be the first network device, or may be a chip, a chipset, or a part of a chip where the chip and the chipset are in the first network device, and the part of the chip is configured to perform a function of a related method. The processing module 1202 is configured to determine cell type information of a cell covered by a second network device, where the cell type information indicates that the cell is a terrestrial network communication cell or a non-terrestrial network communication cell. The transceiver module 1201 is configured to send the cell type information to a third network device.

The second network device may be configured to forward a signal of the first network device.

For example, if the cell type information indicates that the cell is a non-terrestrial network communication cell, the cell type information further indicates an orbit type of the second network device, and the orbit type includes a low-earth orbit, a medium-earth orbit, and a geostationary earth orbit.

For example, the cell type information further indicates that the cell is a moving cell or a fixed cell.

In a specific implementation, the communication apparatus may be specifically configured to implement the method performed by the third network device in embodiments in FIG. 9 to FIG. 11. The apparatus may be the third network device, or may be a chip, a chipset, or a part of a chip where the chip and the chipset are in the third network device, and the part of the chip is configured to perform a function of a related method. The transceiver module 1201 is configured to receive cell type information sent by a first network device, where the cell type information indicates that a cell covered by a second network device is a terrestrial network communication cell or a non-terrestrial network communication cell. The processing module 1202 is configured to store the cell type information.

The second network device may be configured to forward a signal of the first network device.

For example, if the cell type information indicates that the cell is a non-terrestrial network communication cell, the cell type information further indicates an orbit type of the second network device, and the orbit type includes a low-earth orbit, a medium-earth orbit, and a geostationary earth orbit.

For example, the cell type information further indicates that the cell is a moving cell or a fixed cell.

Division into the modules in embodiments of this application is an example, is only division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module. It may be understood that, for functions or implementations of the modules in embodiments of this application, further refer to related descriptions in the method embodiments.

Figure 13:
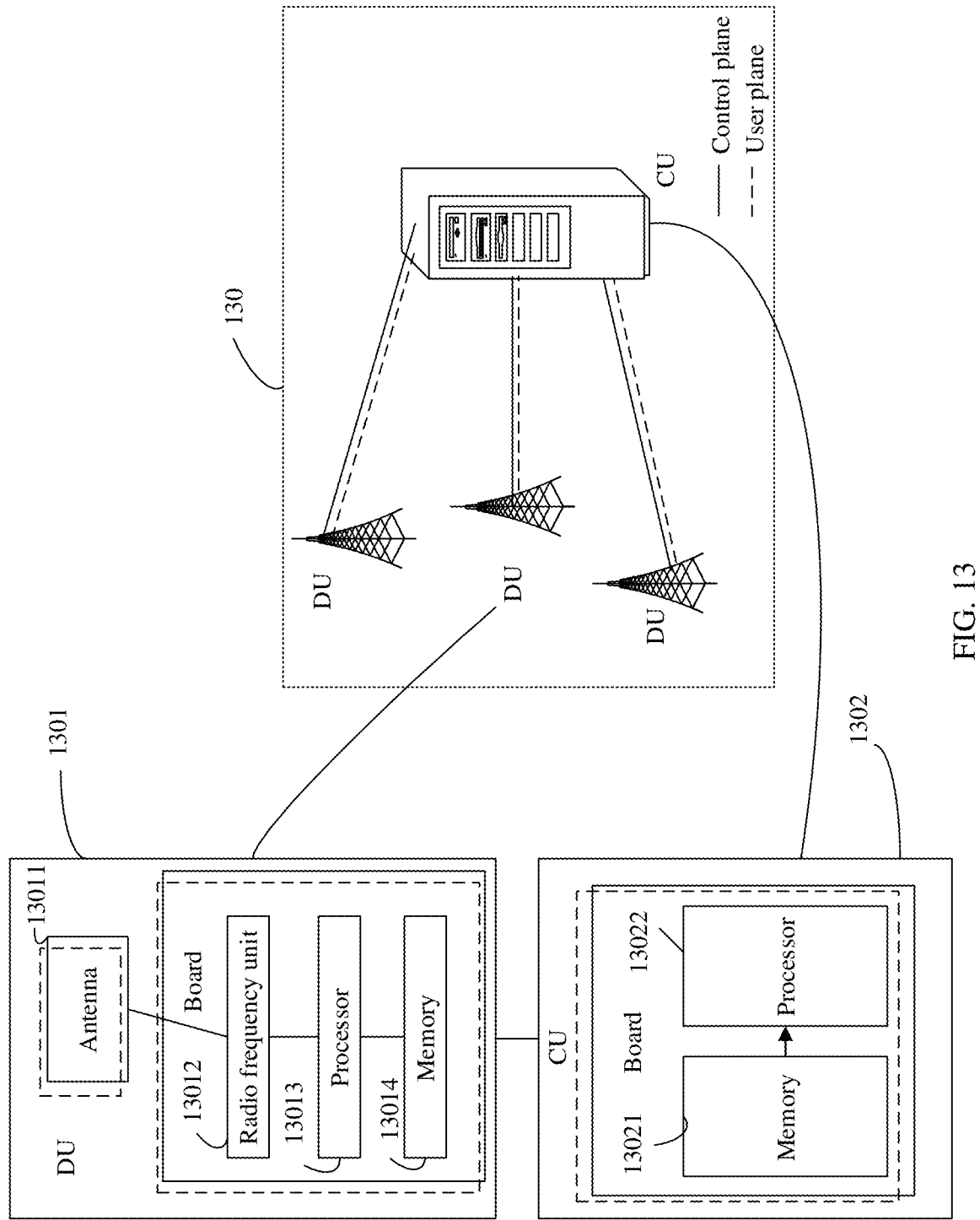
FIG. 13 is a schematic diagram of a structure of a network device according to an embodiment of this application.

FIG. 13 is a schematic diagram of a structure of a network device (for example, a first network device or a third network device) according to an embodiment of this application. For example, FIG. 13 may be a schematic diagram of a structure of a base station. As shown in FIG. 13, the base station may perform functions of the first network device or the third network device in the method embodiments in FIG. 9 to FIG. 11. A base station 130 may include one or more distributed units (DUs) 1301 and one or more central units (CUs) 1302. The DU 1301 may include at least one antenna 13011, at least one radio frequency unit 13012, at least one processor 13013, and at least one memory 13014. The DU 1301 is mainly configured to: send and receive a radio frequency signal, perform conversion between the radio frequency signal and a baseband signal, and perform partial baseband processing. The CU 1302 may include at least one processor 13022 and at least one memory 13021. The CU 1302 and the DU 1301 may communicate with each other through an interface. A control plane interface may be Fs-C, for example, F1-C, and a user plane interface may be Fs-U, for example, F1-U.

The CU 1302 is mainly configured to: perform baseband processing, control the base station, and the like. The DU 1301 and the CU 1302 may be physically disposed together, or may be physically separated, that is, in a distributed base station. The CU 1302 is a control center of the base station, may also be referred to as a processing unit, and is mainly configured to implement a baseband processing function. For example, the CU 1302 may be used by the first network device to perform the operation procedure related to communication between the first network device and the third network device in the method embodiments in FIG. 9 to FIG. 11, or the CU 1302 may be used by the third network device to perform the operation procedure related to communication between the first network device and the third network device in the method embodiments in FIG. 9 to FIG. 11.

Specifically, baseband processing on the CU and the DU may be divided based on a protocol layer of a wireless network. For example, functions of a PDCP layer and a layer above the PDCP layer are deployed on the CU, and functions of protocol layers below the PDCP layer, such as an RLC layer and a MAC layer, are deployed on the DU. For another example, the CU implements functions of an RRC layer and the PDCP layer, and the DU implements functions of the RLC layer, the MAC layer, and a physical (PHY) layer.

In addition, optionally, the base station 130 may include one or more radio frequency units (RUs), one or more DUs, and one or more CUs. The DU may include at least one processor 13013 and at least one memory 13014, the RU may include at least one antenna 13011 and at least one radio frequency unit 13015, and the CU may include at least one processor 13022 and at least one memory 13021.

In an example, the CU 1302 may include one or more boards, and a plurality of boards may jointly support a radio access network (for example, a 5G network) of a single access standard, or may separately support radio access networks (for example, an LTE network, a 5G network, or another network) of different access standards. The memory 13021 and the processor 13022 may serve one or more boards. In other words, a memory and a processor may be disposed on each board. Alternatively, a plurality of boards may share a same memory and a same processor. In addition, a necessary circuit may further be disposed on each board. The DU 1301 may include one or more boards, and a plurality of boards may jointly support a radio access network (for example, a 5G network) of a single access standard, or may separately support radio access networks (for example, an LTE network, a 5G network, or another network) of different access standards. The memory 13014 and the processor 13013 may serve one or more boards. In other words, a memory and a processor may be disposed on each board. Alternatively, a plurality of boards may share a same memory and a same processor. In addition, a necessary circuit may further be disposed on each board.

An embodiment of the present invention further provides a computer-readable storage medium, configured to store computer software instructions that need to be executed by the processor. The computer software instructions include a program that needs to be executed by the processor.

All or some of the foregoing embodiments may be implemented by using software, hardware, firmware, or any combination thereof. When the software is used to implement the foregoing embodiments, all or some of the foregoing embodiments may be implemented in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

What is claimed is:

1. A non-terrestrial network (NTN) communication method, comprising:

determining, by a first network device, cell type information of a cell covered by a second network device; and
sending, by the first network device, a message carrying the cell type information of the cell to a third network device,
wherein the cell type information indicates whether the cell is a terrestrial network communication cell or a non-terrestrial network communication cell; and, when the cell type information indicates that the cell is a non-terrestrial network communication cell, the cell type information further indicates an orbit type of the second network device; and
wherein the cell type information further indicates whether the cell is a moving cell or a fixed cell.

2. The method according to claim 1, wherein the second network device is configured to forward a signal of the first network device.

3. The method according to claim 1, wherein the orbit type comprises a low-earth orbit, a medium-earth orbit, or a geostationary earth orbit.

4. The method according to claim 1, wherein the cell type information further indicates that a neighboring cell is a terrestrial network communication cell or a non-terrestrial network communication cell.

5. The method according to claim 1, wherein the first network device is a base station, and the third network device is a core network device;
the first network device is a distributed unit (DU) of a base station, and the third network device is a central unit (CU) of the base station;
the first network device is a first base station, and the third network device is a second base station; or
the first network device is a central unit control plane (CU-CP), and the third network device is a central unit user plane (CU-UP).

6. The method according to claim 1, wherein the message is an interface setup request message sent by the first network device to the third network device.

7. A non-terrestrial network (NTN) communication apparatus, wherein the apparatus is a first network device or the apparatus is used in a first network device, and the apparatus comprises:
at least one processor; and
one or more memories including computer instructions that, when executed by the at least one processor, cause the apparatus to perform operations comprising:
determining cell type information of a cell covered by a second network device; and
sending a message carrying the cell type information of the cell to a third network device,
wherein the cell type information indicates whether the cell is a terrestrial network communication cell or a non-terrestrial network communication cell; and, when the cell type information indicates that the cell is a non-terrestrial network communication cell, the cell type information further indicates an orbit type of the second network device, and wherein the cell type information further indicates whether the cell is a moving cell or a fixed cell.

8. The apparatus according to claim 7, wherein the second network device is configured to forward a signal of the first network device.

9. The apparatus according to claim 7, wherein the orbit type comprises a low-earth orbit, a medium-earth orbit, or a geostationary earth orbit.

10. The apparatus according to claim 7, wherein the cell type information further indicates that a neighboring cell is a terrestrial network communication cell or a non-terrestrial network communication cell.

11. The apparatus according to claim 7, wherein the first network device is a base station, and the third network device is a core network device;
the first network device is a distributed unit (DU) of a base station, and the third network device is a central unit (CU) of the base station;
the first network device is a first base station, and the third network device is a second base station; or
the first network device is a central unit control plane (CU-CP), and the third network device is a central unit user plane (CU-UP).

12. A non-terrestrial network (NTN) communication apparatus,
wherein the apparatus is a third network device or the apparatus is used in a third network device, and the apparatus comprises:
at least one processor; and
one or more memories including computer instructions that, when executed by the at least one processor, cause the apparatus to perform operations comprising:
receiving a message carrying cell type information sent by a first network device, wherein the cell type information indicates whether a cell covered by a second network device is a terrestrial network communication cell or a non-terrestrial network communication cell; and
storing the cell type information,
wherein, when the cell type information indicates that the cell is a non-terrestrial network communication cell, the cell type information further indicates an orbit type of the second network device; and
wherein the cell type information further indicates that-whether the cell is a moving cell or a fixed cell.

13. The apparatus according to claim 12, wherein the second network device is configured to forward a signal of the first network device.

14. The apparatus according to claim 12, wherein the orbit type comprises a low-earth orbit, a medium-earth orbit, or a geostationary earth orbit.

15. The apparatus according to claim 12, wherein the cell type information further indicates that a neighboring cell is a terrestrial network communication cell or a non-terrestrial network communication cell.

16. The apparatus according to claim 12, wherein the first network device is a base station, and the third network device is a core network device;
the first network device is a distributed unit (DU) of a base station, and the third network device is a central unit (CU) of the base station;
the first network device is a first base station, and the third network device is a second base station; or
the first network device is a central unit control plane (CU-CP), and the third network device is a central unit user plane (CU-UP).

17. The apparatus according to claim 12, wherein the second network device is a non-terrestrial communication device when the cell covered by the second network device is a non-terrestrial network communication cell.

18. The apparatus according to claim 12, wherein the cell type information further indicates a type of the second network device.

19. The apparatus according to claim 12, wherein a type of the second network device is a satellite, aircraft, an air workstation, or a hot air balloon.

\* \* \* \* \*

UNITED STATES PATENT AND TRADEMARK OFFICE
CERTIFICATE OF CORRECTION

| | | |
|---|---|---|
| PATENT NO. | : 12,452,691 B2 | Page 1 of 1 |
| APPLICATION NO. | : 17/984378 | |
| DATED | : October 21, 2025 | |
| INVENTOR(S) | : Yedan Wu et al. | |

It is certified that error appears in the above-identified patent and that said Letters Patent is hereby corrected as shown below:

In the Specification

Column 16, Line 42, change "the CUS" to --the CUs--; and

In the Claims

Column 22, Claim 12, Lines 38 and 39, change "that-whether" to --whether--.

Signed and Sealed this
Eighteenth Day of November, 2025

John A. Squires
*Director of the United States Patent and Trademark Office*